United States Patent [19]

Cooper et al.

[11] Patent Number: 5,741,440
[45] Date of Patent: Apr. 21, 1998

[54] PRODUCTION OF HYDROGEN AND CARBON MONOXIDE

[75] Inventors: James Lee Cooper; Eugene Michael Ingram, both of Longview, Tex.

[73] Assignee: Eastman Chemical Company, Kingsport, Tenn.

[21] Appl. No.: 533,299

[22] Filed: Sep. 25, 1995

Related U.S. Application Data

[63] Continuation-in-part of Ser. No. 203,057, Feb. 28, 1994, abandoned.

[51] Int. Cl.$^6$ ................................................ C01B 3/38
[52] U.S. Cl. ................................ 252/373; 48/198.7
[58] Field of Search .................... 252/373; 48/198.7

[56] References Cited

U.S. PATENT DOCUMENTS

| | | |
|---|---|---|
| 2,579,843 | 12/1951 | Mader . |
| 2,593,584 | 4/1952 | Lynch et al. ........................... 252/373 |
| 3,943,236 | 3/1976 | Green et al. ......................... 423/415 R |
| 4,407,973 | 10/1983 | van Dijk et al. . |
| 4,479,925 | 10/1984 | Shires et al. . |
| 5,004,592 | 4/1991 | Pinto et al. ........................... 423/652 |
| 5,068,057 | 11/1991 | Gustafson et al. . |

FOREIGN PATENT DOCUMENTS

| | | |
|---|---|---|
| 0470626A1 | 8/1991 | European Pat. Off. . |

OTHER PUBLICATIONS

Reed, R.M. Trans. Am. Inst. Chem. Engrs., 41, 453–62 (1945).

Masai, et al., Stud. Sur. Sci. Catal., 36, 67, 1988.

Reitmeier et al, Ind. and Eng. Chemistry 40, 620–6 (1948).

Jockel, H., Hydrocarbon Process, 52, (1) 93 (1973).

Wayne c. Edmister's Applied Hydrocarbon Thermodynamics (Edmister, W.C., Applied Hydrocarbon Thermodynamics, vol. 2, Second Edition, Gulf Publishing 1988.

Rostrup–Nielsen, J.R., Steam Reforming Catalysts, Teknisk Forlag A/S, Copenhagen 1975, Chapters 6 and 9.

Ashcroft, A.T. et al, Nature, 352, 225–6, 1991.

*Primary Examiner*—Gary Geist
*Assistant Examiner*—Sreeni Padmanabhan
*Attorney, Agent, or Firm*—Michael J. Blake; Mark A. Montgomery; Harry J. Gwinnell

[57] ABSTRACT

A method for the preparation of a mixture of hydrogen and carbon monoxide is disclosed. The invention method entails contacting carbon dioxide, hydrogen, and at least one hydrocarbon in the presence of a catalyst containing an active metal. The invention reaction is typically carried out in the presence of a supported active metal catalyst at a temperature in the range of about 700° C. up to 1,100° C. at a pressure in the range of about 7 kPa up to 5,250 kPa.

15 Claims, No Drawings

PRODUCTION OF HYDROGEN AND CARBON MONOXIDE

This application is a Continuation-in-Part of U.S. Ser. No. 08/203,057 filed Feb. 28, 1994 now abandoned.

FIELD OF THE INVENTION

The present invention relates to a process for the production of hydrogen and carbon monoxide. More particularly, the present invention relates to a process for catalytically reforming a feed mixture of carbon dioxide, hydrogen, and hydrocarbon to form a mixture of hydrogen and carbon monoxide.

BACKGROUND OF THE INVENTION

The catalytic reforming of methane and other light hydrocarbons with steam to produce mixtures of hydrogen and carbon monoxide are well established commercial processes. Please see Reed, R. M., Trans. Am. Inst. Chem. Engrs., 41, 453–62 (1945); Kasoka, S., Nenryo Kyokaisi, 59 (633), 25, 1980; Masai, et al., Stud. Sur. Sci. Catal., 36, 67, 1988; and U.S. Pat. Nos. 4,479,925 and 2,579,843. Typically, the ratio of hydrogen to carbon monoxide in the product gas mixture is limited to 3:1 or greater by the reaction stoichiometry. A process of this type is useful for producing pure hydrogen. A modification of the steam reforming of methane and other light hydrocarbons by the addition of carbon dioxide was described by Reitmeier et al, Ind. and Eng. Chemistry, 40, 620–6 (1948). The advantage of this process is that the hydrogen to carbon monoxide ratio in the product gas can be controlled to approximately 1:1 which is useful for processes requiring higher amounts of carbon monoxide, such as the oxo process and the carbonylation process. A disadvantage of these two described processes is that in order to avoid carbon formation (coking) the ratio of steam to methane or other light hydrocarbon in the feed gas must be maintained at 1:1 or greater. Reducing the volume of steam ($H^2O$) to free up reactor space for the production of synthesis gas simply cokes out the reactor and catalyst over time, which is not cost effective. This volume of water significantly reduces the available reactor space for the production of synthesis gas.

In U.S. Pat. No. 3,943,236 discloses the steam reforming of hydrocarbon with carbon dioxide wherein the process has a steam to hydrocarbon ratio reduced from greater than 1.5 to 1 down to 1 to 1 and below. The ratio of steam plus hydrogen to hydrocarbon is increased within the range of 1.5 to 1 up to 5.0 to 1 or greater. The focus in this patent entails replacing steam in the feed gas with an equal molar amount of hydrogen. Additionally, carbon dioxide is added to the feed gas to equal the quantity of hydrogen added. Further, the amount of hydrocarbon contained in the process feed is reduced by the quantity of hydrogen added to the process feed, ie.; water is replaced by hydrogen on an equal molar bases and the hydrocarbon is replaced by carbon dioxide on an equal molar bases. The resultant amount of carbon dioxide in the product stream is well above 20 volume percent.

Additionally, U.S. Pat. No. 5,068,057 discloses a process the preparation of a mixture of hydrogen and carbon monoxide in a mole ratio of about 1:1.5 to 2:1 using a supported platinum catalyst and a feed of methane and carbon dioxide. To achieve a higher (greater than 1:1) hydrogen to carbon monoxide ratio an excess amount of methane would be unconverted (see Table 2 of this patent).

Similarly, processes which utilize light and heavy hydrocarbons, coal tars, kerosene, mineral spirits and the like for production of synthesis gas have been disclosed in U.S. Pat. No. 4,407,973 and Jockel, H., Hydrocarbon Process, 52, (1) 93 (1973).

It would be very desirable to be able to produce hydrogen and carbon monoxide in a wider molar ratio range, particularly without the adverse effects of coking and wasted hydrocarbon feed. Additionally, it would be very desirable to be able to increase the concentration of synthesis gas per unit volume without the production of carbon, which results in the coking of the reactor and catalyst.

SUMMARY OF THE INVENTION

The process according to the present invention for the preparation of a mixture of hydrogen and carbon monoxide comprises contacting a feed mixture of carbon dioxide, hydrogen, and at least one hydrocarbon with a catalyst containing an active metal at a temperature of about 650° to 1450° C., at a pressure of 1 kPa to 70,000 kPa wherein the ratio of water plus hydrogen to hydrocarbon and the ratio of hydrogen to hydrocarbon are both below 1.5:1 and wherein the resulting amount of carbon dioxide in the product stream is less than 20 volume percent.

DETAILED DESCRIPTION OF THE INVENTION

The applicants have unexpectedly discovered a process for the production of hydrogen and carbon monoxide by contacting a feed mixture of carbon dioxide, hydrogen and at least one hydrocarbon that dramatically increases the quantity of synthesis gas prepared when compared to conventional steam reforming of methane and carbon dioxide. The molar ratio of hydrogen to carbon monoxide produced in the present process can vary dramatically such as from 0.7:1 to 3:1 hydrogen:carbon monoxide (see Examples 1–13). A portion or all of the water in the steam reforming process can unexpectedly be replaced with hydrogen without the formation of carbon resulting in a carbon free operation at higher concentration of synthesis gas per unit volume. As shown in the examples, the process according to the present invention using a supported nickel catalyst at temperatures above 700° C. resulted in carbon free operation and no catalyst deactivation after at least 72 hours of continuous run time.

The process according to the present invention for the preparation of a mixture of hydrogen and carbon monoxide comprises contacting a feed mixture of carbon dioxide, hydrogen, and at least one hydrocarbon with a catalyst containing an active metal at a temperature of about 650° to 1450° C., at a pressure of 1 kPa to 70,000 kPa.

The active metal can be supported or unsupported thus being a portion or the entire catalyst depending upon the catalyst loading and type of catalyst used. The term "active metal" used herein means a transition element which activates hydrocarbons, steam, carbon dioxide, and hydrogen through a process of absorption followed by carbon—carbon, carbon-hydrogen, carbon-oxygen, hydrogen—hydrogen, and hydrogen-oxygen bond cleavage (breakage), reassociation of atoms into molecules and finally desorption from the catalyst surface.

The active metal content of the catalysts can vary widely with the amount of active metal being an amount that one skilled in the art would choose to achieve the desired conversion of feedstock, typically based on methane conversion, to synthesis gas product. The lower amount of active metal can be 0.1 weight percent or even lower if longer process times or lower conversions are desired. This amount of active metal on a support can be 0.1 to 30 weight percent or preferably 0.5 to 25 weight percent. For example, nickel supported catalysts are available with nickel loadings of between 0.1 weight percent to 30 weight percent or greater and available platinum supported catalysts typically contain between 0.1 weight percent to 1.5 weight percent platinum.

The number of suitable catalysts and catalysts combinations useful in the practice of the present invention can be very large. Examples of some preferred metals that are the most commonly known include, but are not limited to nickel, platinum, palladium, iron, rhodium, ruthenium, cobalt, rhenium, copper and combinations thereof. The preferred metal of the present invention to be used in a catalytic process is nickel due to its relatively low cost and ready availability. In the case of a non-catalytic process such as coal gasification a specified catalyst is unnecessary due to the presence of catalytically active fines, such as iron particles. In some cases the use of catalyst promoters are preferred since they increase the catalyst activity or hinder the buildup of carbon on the catalyst. Examples of suitable promoters include chromium, cesium, rhenium, molybdenum, vanadium, aluminum, alkali metals such as potassium, alkaline earth metals such as magnesium and barium, and rare earth metals such as lanthanum.

Any suitable support or combination of support materials which are stable to the process conditions would be useful in supporting the catalytic metal of the present invention. Suitable examples including magnesium oxide, aluminum oxide, zirconium oxide, chromium oxide, titanium oxide, uranium oxide, magnesia-alumina, silica oxides, calcium oxide, silica aluminas, molecular sieves, keiselghur, clay minerals, and combinations thereof. Magnesium and aluminum based supports are preferred materials due to their availability and ease of handling.

The active metal content of some preferred catalyst on the support include nickel at a concentration of 0.1 to 50 weight percent, preferably 1 to 30 weight percent, with a concentration of nickel on the stable support of about 5 to 25 weight percent being most preferred; platinum, palladium, rhodium, ruthenium, and rhenium about 0.1 to 5 weight percent, preferably 0.2 to 2 weight percent, with a weight percent of about 0.5 to 1.5 being most preferred; and iron and cobalt about 0.1 to 100 weight percent, preferably about 10 to 99 weight percent, with a weight percent of about 50 to 95 weight percent being most preferred. Generally higher amounts of metals could be used; however, for the particularly active metals higher amounts might not significantly effect the production of synthesis gas but simply increase the cost of the catalyst.

The catalysts used in the examples of the present invention are in the form of approximately ½-inch rings. However, it should be readily understood by those skilled in the art that other catalyst sizes and forms could be more preferable, depending upon the particular reactor configuration, pressure drop considerations, space velocities, and desired feedstock conversion. Shapes such as spheres, pellets, saddles, single or multi-hole rings and stars are examples of shapes considered useful in the practice of the present invention.

The amount of each component in the feed gas composition can vary widely, depending upon the desired product gas composition. For example, for a process in which water is contained in the methane and carbon dioxide feed gas the replacement of some portion of the water with hydrogen unexpectedly increases the concentration of synthesis gas, with carbon monoxide being the primary consideration, in the product gas stream. Removing of all water from the methane and carbon dioxide feed gas stream and replacing it with a specified quantity of hydrogen further unexpectedly increases the concentration of desired synthesis gas in the product gas stream. The hydrogen to carbon monoxide, $H_2/CO$, ratio could decrease, remain unchanged, or increase for the example depending on the quantity of hydrogen added. The ratio of $H_2/CO$ in the product stream preferably varies from 0.1:1 to 100:1, more preferably from 0.5:1 to 10:1 with the ratio of $H_2/CO$ varying within the range of 0.7:1 to 4:1 being most preferred.

The ratios of feed gases are important for producing a specified composition in the product gas stream and to achieve carbon free operation. For typical applications the water plus hydrogen to methane (or other hydrocarbon) ratio or the hydrogen to methane ratio in the feed is 0.1:1 to 100:1. However, to obtain the benefits according to the present invention it is preferred that both of these ratios be below 1.5:1. These ratios are more preferably 0.3:1 to less than 1.5:1 with the most preferred range being from 0.5:1 to less than 1.5:1. The carbon dioxide to methane ratio in the feed (introduced or generated in situ) can be from 0.01:1 to 100:1 preferably 0.1:1 to 5:1, with the most preferred range being from 0.5:1 to 2:1. The carbon dioxide to hydrogen ratio or carbon dioxide to hydrogen plus water ratio in the feed can be within the range of 0.01:1 to 200:1 preferably 0.1:1 to 20:1 with the most preferred range being from 0.2:1 to 5:1.

It is also important to describe the range of desirable feed gas molar ratios of compositions in terms of at least two components to hydrocarbon, one of these components being carbon dioxide. These ratios can be stated three different ways: steam plus carbon dioxide to hydrocarbon (preferably methane); steam plus hydrogen plus carbon dioxide to hydrocarbon; hydrogen plus carbon dioxide to hydrocarbon. According to the present invention the ratios of these three separate groups to hydrocarbon are within the range of 0.11:1 to 200:1 preferably 0.4:1 to 30:1 more preferred between 1:1 to 15:1 with the most preferred range being 1.2:1 to 3:1.

Within the scope and ranges of the present invention the composition of the feed gas can vary widely depending on the desired product composition. The replacement of steam with hydrogen significantly increases the quantity of carbon monoxide and synthesis gas produced compared to an equivalent, molar ratio, feed gas containing only steam, hydrocarbon and carbon dioxide. The substitution of hydrogen for steam in the process feed gas does not require a change in the quantity of hydrocarbon or carbon dioxide contained in the feed gas. There is no need to reduce the amount of hydrocarbon in the feed and there is no need to increase the amount of carbon dioxide in the feed. The addition of extra carbon dioxide in the feed also increases the need for more carbon dioxide removal from the product stream. Thus, the resulting product stream produced according to the process of the present invention contains less than 20 percent (volume or mole) carbon dioxide, preferably less than 15 percent, with a percent of carbon dioxide below 10 percent being more preferred.

The speed of the feed gases or space velocity through a reactor can generally be any amount of gas useful for the production of hydrogen and carbon monoxide. The space velocity of feed gases is generally within the range of about 300 to 305,000 meters per hour, preferably about 3,000 to 152,500 meters per hour with a space hour velocity of about 7,000 to 30,000 meters per hour being most preferred. The space hour velocity is limited in existing tubular reforming processes by the pressure drop across the tube and the heat transfer through the tube walls. Any new process can have a space velocity with ranges only limited by the design. For non-tubular designs such as coal gasification and autothermal reforming, temperature control, for example, can become a limitation at higher than design feed rates.

The hydrocarbon used for illustration of the present invention was methane. However, the use of other light hydrocarbons, such as ethane, propane, butane, etc., could clearly be useful alone or in combinations, such as methane with less than 5 percent of the $C_2$ to $C_4$ hydrocarbons. Furthermore, other hydrocarbon feedstocks such as naphtha, mineral spirits, coal tars, hydrocracking bottoms, coal, etc., could be used for the production of synthesis gas according to the present invention by introducing hydrogen into the reaction zone.

The use of hydrogen according to the present invention to increase the production of synthesis gas by partially or totally replacing water is not limited to a particular process type, although steam reforming is more preferred. Examples of alternative designs include conventional steam reforming or autothermal reforming or any gasification process wherein the composition of the product synthesis gas is influenced by the addition of hydrogen in which carbon dioxide, either added or formed in the process, is converted to valuable carbon monoxide in the reaction zone. It is clear from the description of the process of the present invention that hydrogen could be introduced into the reaction zone separately or in combination with the other feed gas materials.

The temperature range for operation of a tubular reforming process; ie, conventional steam reforming, can vary widely and depends upon the desired product gas composition, materials of construction and catalyst stability/durability at elevated temperatures. In general the higher the temperature the higher the methane and carbon dioxide conversion is to carbon monoxide and hydrogen. The minimum temperature would be considered the temperature at which carbon monoxide decomposes to form carbon which is around 650° C. The upper temperature limit is around 1,260° C. but it is not limited by the present invention but rather by physical limitations imposed by metallurgy and catalyst. The preferred temperature range is from 700° to 1,100° C. For non-tubular reforming processes, such as coal gasification, higher temperatures in the range of 1,350° C. to 1,450° C. are readily achieved.

The operating pressure can vary from 1 kPa to 70,000 kPa. The equilibrium conversion increases as the pressure is lowered, thus the preferred operating pressure is as low as commercially feasible. The preferred range is from 7 kPa to 5,250 kPa. The most preferred range is from 70 kPa to 3,500 kPa.

Other operational parameters, such as reactor configuration, residence time, space velocity, or percent conversion of methane or carbon dioxide will be determined based on the desired product gas content and can be readily identified by one skilled in the art.

The following examples illustrate the present invention. However, these examples are not intended as a limitation upon the reasonable scope thereof.

EXAMPLES

Two types of catalyst loads were used for these examples which can be described as a single load of catalyst and a double load of catalyst. For the double load of catalyst the feed gases would first pass through the upper catalyst bed which contained approximately 10.5 weight percent nickel on a magnesium oxide support and then pass through the bottom catalyst which contained approximately 8 weight percent nickel on an aluminum oxide support. The platinum catalyst was supplied by Johnson Matthey and contained 0.75 weight percent platinum supported on aluminum oxide. The platinum supported catalyst examples were completed using a single load.

Computer simulations of the reaction thermodynamics utilized data contained in Wayne C. Edmister's Applied Hydrocarbon Thermodynamics (Edmister, W. C., Applied Hydrocarbon Thermodynamics, Vol 2, Second Edition, Gulf Publishing Company 1988.) and Rostrup-Nielson's Catalytic Steam Reforming (Rostrup-Nielsen, J. R., Steam Reforming Catalysts, Teknisk Forlag A/S, Copenhagen 1975. Ashcroft, A. T. et al, Nature, 352, 225–6, 1991.) These simulations were used to examine the reforming of methane with carbon dioxide and hydrogen or hydrogen and/or steam. The model used was based on a Microsoft Excel 4.0 spreadsheet.

Pilot plant experiments were conducted in a 1.25 inch I.D. by approximately 34 inch long reaction tube equipped with a bottom mounted thermowell. Catalyst temperatures were controlled using a three band electric heater connected to three thermocouples equally spaced within the catalyst bed. Reaction pressure was maintained between 70 kPa and 80 kPa. Gas flow rates were controlled by mass flow meters. Progress of the experiments were monitored by observing the outlet compositions using a HP 3390 gas chromatograph equipped with a thermal conductivity detector. Gas separation was achieved using a packed column in series consisting of a 10 foot by ⅛ inch Chromosorb 101 section followed by a 6 foot by ⅛ inch section of Porpak Q. Argon was used as the carrier gas. The temperature program was typically 70° to 220° C. at 15° C. per minute. The catalyst was typically charged to the reactor in 10 equally spaced layers separated with 316 stainless steel Penn State packing but the quantity or spacing or activity of the catalyst was found not to be critical for demonstration of the invention.

Theoretical Illustration

After the discovery of the present invention the following theoretical reactions were drawn up to illustrate the theoretical advantage of introducing hydrogen in a reforming process according to the present invention. Reactions A and B compare the product distribution of an equal mole reaction between methane, carbon dioxide and hydrogen to an equal mole reaction between methane, carbon dioxide and water at complete conversion to product.

TABLE 1

| Reactions | Feed Gas, mole | | | | Product Composition, mole | | | |
|---|---|---|---|---|---|---|---|---|
| | $CH_4$ | $CO_2$ | $H_2O$ | $H_2$ | CO | $H_2O$ | $H_2$ | $CO_2$ |
| A | 1 | 1 | 1 | 0 | 2 | 1 | 2 | |
| B | 1 | 1 | 0 | 1 | 2 | 0 | 3 | |
| C | 1 | 4 | 1 | 0 | 4 | 3 | 0 | 1 |
| D | 1 | 4 | 0 | 1 | 5 | 3 | 0 | 0 |

Reaction A simulates the steam reforming of methane and carbon dioxide. The product consists of 2 moles each of carbon monoxide and hydrogen and 1 mole of water. The water reduces the available reactor space and a cost is associated with removing it from the synthesis gas. Reaction B simulates reforming with hydrogen. Reaction B results in 2 moles of carbon monoxide and 3 moles of hydrogen and illustrates the increase in concentration of synthesis gas that can be achieved with hydrogen reforming.

Reactions C and D compare the product distribution resulting from the reaction of 1 mole each of methane and water with 4 moles of carbon dioxide versus the reaction of 1 mole each of carbon monoxide and hydrogen with 4 moles of carbon dioxide, respectively, at complete conversion to product. Reaction D which contains hydrogen in the feed gas results in the production of 5 moles of carbon monoxide whereas Reaction C which simulates steam reforming results in the production of 4 moles of carbon monoxide. Reaction D illustrates the advantage of having hydrogen in the feed gas which produces an increased quantity of carbon monoxide in comparison to conventional steam reforming.

Examples 1–3

Supported nickel catalysts were charged to the reforming pilot plant and fully activated. The catalysts were Dycat catalysts (from Dycat International) with Ni content ranging from 10.5 to 8% on either magnesium oxide or alumina support. The product composition resulting from a feed gas comprised of 6 liters per minute of carbon dioxide, 4 liters per minute of methane and variable amounts of water and hydrogen was determined at 787° C. The results are given in Table 2.

TABLE 2

| | Feed Gas | | Product Composition | | | |
|---|---|---|---|---|---|---|
| | $H_2$ | $H_2O$ | mole % (dry basis) | | | |
| Example | l/min | ml/min | CO | $H_2$ | $CH_4$ | $CO_2$ |
| 1 | 0 | 2.6 | 40.4 | 44.5 | 0.8 | 14.3 |
| 2 | 0.4 | 2.3 | 40.5 | 45.9 | 0.8 | 12.8 |
| 3 | 0.8 | 2.0 | 40.9 | 46.3 | 0.9 | 11.9 |

These results demonstrate that the substitution of hydrogen for a portion of the water feed increases the percent of carbon monoxide in the product and the overall percent of synthesis gas in the crude product stream. These results also show that a substantial reduction in the quantity of carbon dioxide in the product gas can be achieved thus reducing the cost of recovery.

Example 4

The catalyst, feed gas composition, and conditions of Example 3 were employed but the reaction temperature was 815° C. The outlet composition in mole % (dry basis) was 42.1 CO, 46.1 $H_2$, 0.6 $CH_4$, and 11.3 $CO_2$. Examples 3 and 4 demonstrate that the product composition can be varied by reaction temperature.

Examples 5 and 6

Examples 5 and 6 are comparisons of reforming methane with carbon dioxide and water to reforming of methane with carbon dioxide and hydrogen. The mole ratio of methane to carbon dioxide to water/hydrogen remained constant at 1.5:2.0:1.0, respectively. The reaction temperature was maintained at 787° C. in the pilot plant unit.

TABLE 3

| Example | Feed Gas, mole ratio | | | | Product Composition, mole % (dry basis) | | | | $H_2$/CO Ratio |
|---|---|---|---|---|---|---|---|---|---|
| | $CH_4$ | CO2 | $H_2O$ | $H_2$ | CO | $H_2$ | $CH_4$ | $CO_2$ | |
| 5 | 1.5 | 2.0 | 1.0 | 0 | 42.7 | 41.0 | 0.74 | 15.59 | 0.96 |
| 6 | 1.5 | 2.0 | 1.0 | 48.2 | 41.6 | 1.80 | 8.4 | 0.86 | |

These results show that when hydrogen is substituted for water the quantity of desired synthesis gas produced is increased.

Examples 6 through 13

These examples demonstrate the utility of the invention over a wide range of feed gas compositions to produce synthesis gas with various hydrogen to carbon monoxide ratios. These runs were conducted in the pilot plant using a supported nickel catalyst with a reaction temperature of 787° C. Example 6 above is included herein for illustration with the feed gas mole ratio adjusted so that $CH_4$ is equal to 1.

TABLE 4

| Example | Feed Gas, mole ratio | | | Product Composition mole % (dry basis) | | | | $H_2$/CO Ratio | Reaction Time, hr |
|---|---|---|---|---|---|---|---|---|---|
| | $CH_4$ | $CO_2$ | $H_2$ | CO | $H_2$ | $CH_4$ | $CO_2$ | | |
| 7 | 1 | 2.9 | 0.91 | 46.6 | 32.9 | 0.66 | 19.8 | 0.71 | 23 |
| 8 | 1 | 2.1 | 1 | 47.1 | 39.0 | 1.3 | 12.6 | 0.83 | 72 |
| 6 | 1 | 1.3 | 0.68 | 48.2 | 41.6 | 1.8 | 8.4 | 0.86 | 25 |
| 9 | 1 | 2.1 | 2.4 | 43.4 | 44.0 | 1.4 | 11.2 | 0.99 | 4 |
| 10 | 1 | 2.25 | 4 | 43.6 | 44.1 | 1.4 | 10.9 | 1.01 | 4 |
| 11 | 1 | 1.76 | 5.93 | 35.9 | 54.5 | 3.5 | 6.1 | 1.52 | 12 |
| 12 | 1 | 2.69 | 4.29 | 28.6 | 54.2 | 6.2 | 11.1 | 1.9 | 21 |
| 13 | 1 | 2.73 | 8.05 | 24.1 | 61.3 | 6.5 | 8.1 | 2.55 | 3 |

These results demonstrate that a wide variation in hydrogen to carbon monoxide ratios can be achieved by varying the feed gas ratios. The process, no loss of catalyst activity and no carbon formation, is shown to be stable under a wide variety of feed composition as demonstrated by continuous pilot plant operation for 72 hours.

Examples 14 through 103

These examples were generated by a computer and are based upon the present invention. These examples illustrate the wide range of product gas compositions which are possible by varying the hydrogen to methane to carbon dioxide feed gas ratio. The methane leakage, unconverted methane in the product gas, was fixed at 0.2 mole percent. The set methane leakage resulted in a variable reaction temperature.

TABLE 5

| Example | Feed Gas, mole ratio | | | Product Composition: mole % (wet basis) | | | | | $H_2/CO$ Ratio | Reaction Temp, C. |
|---|---|---|---|---|---|---|---|---|---|---|
| | $H_2$ | $CH_4$ | $CO_2$ | $H_2$ | $CH_4$ | $CO_2$ | $H_2O$ | CO | | |
| 14 | 0.5 | 1 | 1 | 55.22 | 0.20 | 0.06 | 0.16 | 44.35 | 1.245 | 1,127 |
| 15 | 1 | 1 | 1 | 59.68 | 0.20 | 0.05 | 0.17 | 39.90 | 1.496 | 1,134 |
| 16 | 1.5 | 1 | 1 | 63.32 | 0.20 | 0.04 | 0.17 | 36.26 | 1.746 | 1,137 |
| 17 | 2 | 1 | 1 | 66.36 | 0.20 | 0.04 | 0.18 | 33.22 | 1.997 | 1,140 |
| 18 | 2.5 | 1 | 1 | 68.93 | 0.20 | 0.03 | 0.18 | 30.65 | 2.249 | 1,141 |
| 19 | 3 | 1 | 1 | 71.14 | 0.20 | 0.03 | 0.18 | 28.45 | 2.5 | 1,142 |
| 20 | 3.5 | 1 | 1 | 73.05 | 0.20 | 0.03 | 0.18 | 26.54 | 2.752 | 1,142 |
| 21 | 4 | 1 | 1 | 74.72 | 0.20 | 0.03 | 0.19 | 24.87 | 3.004 | 1,142 |
| 22 | 4.5 | 1 | 1 | 76.19 | 0.20 | 0.02 | 0.19 | 23.40 | 3.257 | 1,142 |
| 23 | 5 | 1 | 1 | 77.50 | 0.20 | 0.02 | 0.19 | 22.09 | 3.509 | 1,140 |
| 24 | 0.5 | 1 | 1.5 | 44.17 | 0.20 | 4.62 | 5.64 | 45.37 | 0.973 | 880 |
| 25 | 1 | 1 | 1.5 | 48.75 | 0.20 | 3.72 | 5.63 | 41.71 | 1.169 | 890 |
| 26 | 1.5 | 1 | 1.5 | 52.64 | 0.20 | 3.05 | 5.53 | 38.57 | 1.365 | 899 |
| 27 | 2 | 1 | 1.5 | 56.00 | 0.20 | 2.55 | 5.39 | 35.86 | 1.562 | 906 |
| 28 | 2.5 | 1 | 1.5 | 58.92 | 0.20 | 2.16 | 5.23 | 33.49 | 1.759 | 912 |
| 29 | 3 | 1 | 1.5 | 61.48 | 0.20 | 1.85 | 5.06 | 31.41 | 1.957 | 917 |
| 30 | 3.5 | 1 | 1.5 | 63.74 | 0.20 | 1.60 | 4.88 | 29.57 | 2.156 | 921 |
| 31 | 4 | 1 | 1.5 | 65.76 | 0.20 | 1.40 | 4.72 | 27.92 | 2.355 | 925 |
| 32 | 4.5 | 1 | 1.5 | 67.56 | 0.20 | 1.24 | 4.55 | 26.45 | 2.554 | 928 |
| 33 | 5 | 1 | 1.5 | 69.19 | 0.20 | 1.10 | 4.40 | 25.12 | 2.754 | 931 |
| 34 | 0.5 | 1 | 2 | 36.58 | 0.20 | 9.80 | 8.67 | 44.75 | 0.817 | 833 |
| 35 | 1 | 1 | 2 | 40.94 | 0.20 | 8.08 | 8.86 | 41.91 | 0.977 | 844 |
| 36 | 1.5 | 1 | 2 | 44.77 | 0.20 | 6.76 | 8.90 | 39.37 | 1.137 | 853 |
| 37 | 2 | 1 | 2 | 48.15 | 0.20 | 4.73 | 8.82 | 37.09 | 1.298 | 861 |
| 38 | 2.5 | 1 | 2 | 51.16 | 0.20 | 4.91 | 8.68 | 35.04 | 1.46 | 868 |
| 39 | 3 | 1 | 2 | 53.85 | 0.20 | 4.26 | 8.51 | 33.19 | 1.622 | 874 |
| 40 | 3.5 | 1 | 2 | 56.27 | 0.20 | 3.72 | 8.30 | 31.51 | 1.785 | 879 |
| 41 | 4 | 1 | 2 | 58.45 | 0.20 | 3.28 | 8.09 | 29.99 | 1.949 | 883 |
| 42 | 4.5 | 1 | 2 | 60.43 | 0.20 | 2.91 | 7.87 | 28.60 | 2.113 | 887 |
| 43 | 5 | 1 | 2 | 62.23 | 0.20 | 2.59 | 7.65 | 27.32 | 2.278 | 891 |
| 44 | 0.5 | 1 | 2.5 | 31.05 | 0.20 | 14.92 | 10.39 | 43.43 | 0.715 | 802 |
| 45 | 1 | 1 | 2.5 | 35.12 | 0.20 | 12.55 | 10.83 | 41.30 | 0.85 | 814 |
| 46 | 1.5 | 1 | 2.5 | 38.76 | 0.20 | 10.68 | 11.05 | 39.32 | 0.986 | 824 |
| 47 | 2 | 1 | 2.5 | 42.04 | 0.20 | 9.17 | 11.12 | 37.47 | 1.122 | 832 |
| 48 | 2.5 | 1 | 2.5 | 45.00 | 0.20 | 7.96 | 11.08 | 35.76 | 1.258 | 839 |
| 49 | 3 | 1 | 2.5 | 47.70 | 0.20 | 6.96 | 10.97 | 34.18 | 1.396 | 846 |
| 50 | 3.5 | 1 | 2.5 | 50.15 | 0.20 | 6.13 | 10.81 | 32.71 | 1.533 | 852 |
| 51 | 4 | 1 | 2.5 | 52.39 | 0.20 | 5.44 | 10.62 | 31.35 | 1.672 | 857 |
| 52 | 4.5 | 1 | 2.5 | 54.45 | 0.20 | 4.86 | 10.41 | 30.08 | 1.81 | 861 |
| 53 | 5 | 1 | 2.5 | 56.35 | 0.20 | 4.36 | 10.19 | 28.90 | 1.949 | 865 |
| 54 | 0.5 | 1 | 3 | 26.87 | 0.20 | 19.75 | 11.35 | 41.83 | 0.642 | 779 |
| 55 | 1 | 1 | 3 | 30.62 | 0.20 | 16.88 | 12.01 | 40.28 | 0.76 | 791 |
| 56 | 1.5 | 1 | 3 | 34.04 | 0.20 | 14.56 | 12.42 | 38.78 | 0.878 | 801 |
| 57 | 2 | 1 | 3 | 37.17 | 0.20 | 12.67 | 12.64 | 37.33 | 0.996 | 810 |
| 58 | 2.5 | 1 | 3 | 40.03 | 0.20 | 11.10 | 12.73 | 35.94 | 1.114 | 818 |
| 59 | 3 | 1 | 3 | 42.66 | 0.20 | 9.80 | 12.72 | 34.62 | 1.232 | 825 |
| 60 | 3.5 | 1 | 3 | 45.09 | 0.20 | 8.70 | 12.64 | 33.36 | 1.351 | 831 |
| 61 | 4 | 1 | 3 | 47.33 | 0.20 | 7.78 | 12.51 | 32.18 | 1.471 | 836 |
| 62 | 4.5 | 1 | 3 | 49.41 | 0.20 | 6.98 | 12.35 | 31.06 | 1.591 | 841 |
| 63 | 5 | 1 | 3 | 51.34 | 0.20 | 6.30 | 12.16 | 30.00 | 1.711 | 846 |
| 64 | 0.5 | 1 | 3.5 | 23.61 | 0.20 | 24.21 | 11.86 | 40.13 | 0.588 | 760 |
| 65 | 1 | 1 | 3.5 | 27.07 | 0.20 | 20.98 | 12.70 | 39.06 | 0.693 | 772 |
| 66 | 1.5 | 1 | 3.5 | 30.26 | 0.20 | 18.31 | 13.27 | 37.95 | 0.797 | 783 |
| 67 | 2 | 1 | 3.5 | 33.21 | 0.20 | 16.10 | 13.64 | 36.85 | 0.901 | 792 |
| 68 | 2.5 | 1 | 3.5 | 35.95 | 0.20 | 14.24 | 13.85 | 35.75 | 1.006 | 800 |
| 69 | 3 | 1 | 3.5 | 38.49 | 0.20 | 12.67 | 13.96 | 34.68 | 1.11 | 807 |
| 70 | 3.5 | 1 | 3.5 | 40.86 | 0.20 | 11.34 | 13.97 | 33.64 | 1.215 | 814 |
| 71 | 4 | 1 | 3.5 | 43.06 | 0.20 | 10.20 | 13.92 | 32.63 | 1.32 | 819 |
| 72 | 4.5 | 1 | 3.5 | 45.12 | 0.20 | 9.21 | 13.81 | 31.66 | 1.425 | 824 |
| 73 | 5 | 1 | 3.5 | 47.04 | 0.20 | 8.36 | 13.68 | 30.73 | 1.531 | 829 |
| 74 | 0.5 | 1 | 4 | 21.00 | 0.20 | 28.29 | 12.08 | 38.44 | 0.546 | 744 |
| 75 | 1 | 1 | 4 | 24.19 | 0.20 | 24.79 | 13.06 | 37.75 | 0.641 | 757 |
| 76 | 1.5 | 1 | 4 | 27.17 | 0.20 | 21.87 | 13.77 | 36.98 | 0.735 | 767 |
| 77 | 2 | 1 | 4 | 29.96 | 0.20 | 19.40 | 14.27 | 36.17 | 0.828 | 777 |
| 78 | 2.5 | 1 | 4 | 32.56 | 0.20 | 17.31 | 14.61 | 35.33 | 0.921 | 785 |
| 79 | 3 | 1 | 4 | 34.99 | 0.20 | 15.51 | 14.81 | 34.48 | 1.015 | 792 |
| 80 | 3.5 | 1 | 4 | 37.27 | 0.20 | 13.97 | 14.92 | 33.63 | 1.108 | 799 |
| 81 | 4 | 1 | 4 | 39.42 | 0.20 | 12.64 | 14.95 | 32.79 | 1.202 | 805 |
| 82 | 4.5 | 1 | 4 | 41.43 | 0.20 | 11.48 | 14.92 | 31.97 | 1.296 | 811 |
| 83 | 5 | 1 | 4 | 43.33 | 0.20 | 10.46 | 14.84 | 31.17 | 1.39 | 816 |

TABLE 5-continued

| Example | Feed Gas, mole ratio | | | Product Composition: mole % (wet basis) | | | | | H₂/CO Ratio | Reaction Temp, C. |
|---|---|---|---|---|---|---|---|---|---|---|
| | $H_2$ | $CH_4$ | $CO_2$ | $H_2$ | $CH_4$ | $CO_2$ | $H_2O$ | CO | | |
| 84 | 0.5 | 1 | 4.5 | 18.86 | 0.20 | 32.01 | 12.12 | 36.80 | 0.513 | 730 |
| 85 | 1 | 1 | 4.5 | 21.83 | 0.20 | 28.33 | 13.22 | 36.43 | 0.599 | 743 |
| 86 | 1.5 | 1 | 4.5 | 24.61 | 0.20 | 25.21 | 14.04 | 35.94 | 0.685 | 754 |
| 87 | 2 | 1 | 4.5 | 27.23 | 0.20 | 22.55 | 14.65 | 35.37 | 0.77 | 763 |
| 88 | 2.5 | 1 | 4.5 | 29.69 | 0.20 | 20.26 | 15.09 | 34.76 | 0.854 | 772 |
| 89 | 3 | 1 | 4.5 | 32.02 | 0.20 | 18.28 | 15.39 | 34.11 | 0.939 | 779 |
| 90 | 3.5 | 1 | 4.5 | 34.21 | 0.20 | 16.56 | 15.59 | 33.43 | 1.023 | 786 |
| 91 | 4 | 1 | 4.5 | 36.29 | 0.20 | 15.06 | 15.70 | 32.75 | 1.180 | 792 |
| 92 | 4.5 | 1 | 4.5 | 38.25 | 0.20 | 13.75 | 15.74 | 32.07 | 1.193 | 798 |
| 93 | 5 | 1 | 4.5 | 40.10 | 0.20 | 12.59 | 15.73 | 31.38 | 1.278 | 803 |
| 94 | 0.5 | 1 | 5 | 17.09 | 0.20 | 35.41 | 12.05 | 35.26 | 0.485 | 718 |
| 95 | 1 | 1 | 5 | 19.85 | 0.20 | 31.60 | 13.23 | 35.13 | 0.565 | 731 |
| 96 | 1.5 | 1 | 5 | 22.45 | 0.20 | 28.34 | 14.14 | 34.87 | 0.644 | 742 |
| 97 | 2 | 1 | 5 | 24.92 | 0.20 | 25.52 | 14.85 | 34.52 | 0.722 | 752 |
| 98 | 2.5 | 1 | 5 | 27.25 | 0.20 | 23.07 | 15.38 | 34.09 | 0.799 | 760 |
| 99 | 3 | 1 | 5 | 29.47 | 0.20 | 20.94 | 15.77 | 33.61 | 0.877 | 768 |
| 100 | 3.5 | 1 | 5 | 31.57 | 0.20 | 19.08 | 16.05 | 33.10 | 0.954 | 775 |
| 101 | 4 | 1 | 5 | 33.57 | 0.20 | 17.44 | 16.23 | 32.56 | 1.031 | 781 |
| 102 | 4.5 | 1 | 5 | 35.47 | 0.20 | 15.99 | 16.34 | 32.00 | 1.108 | 787 |
| 103 | 5 | 1 | 5 | 37.27 | 0.20 | 14.70 | 16.39 | 31.43 | 1.186 | 792 |

Examples 104 through 107

These examples demonstrate the utility of the present invention and is compared to conventional steam reforming of methane with carbon dioxide and is compared to the reforming of methane with carbon dioxide and steam wherein a portion of the steam contained in the feed is substituted with hydrogen, a quantity of carbon dioxide equal to hydrogen is also added to the feed gas and the quantity of methane contained in the feed gas is reduced by the equivalent amount of carbon dioxide added to the feed gas, all of which is on a mole basis. These experiments were conducted in the pilot plant unit at 787° C. using a double load of supported nickel catalyst. In each experiment the total quantity of feed gas is maintained at a total of 4 liters such that a direct comparison can readily be conducted.

TABLE 6

| Example | Feed Gas Mole Ratio | | | | Product Composition Mole % (Dry Basis) | | | | H2/CO Ratio |
|---|---|---|---|---|---|---|---|---|---|
| | CH4 | CO2 | H2 | H2O | CO | H2 | CH4 | CO2 | |
| 104 | 1 | 1.5 | 0 | 1.5 | 32.3 | 49.8 | 1.7 | 16.20 | 1.54 |
| 105 | 1 | 1.5 | 1.0 | 0.5 | 37.0 | 51.9 | 1.6 | 9.52 | 1.40 |
| 106 | 1 | 1.5 | 1.5 | 0 | 38.8 | 53.1 | 2.5 | 5.69 | 1.37 |
| 107 | 0.5 | 2.0 | 0.5 | 1.0 | 29.2 | 34.7 | 0.8 | 35.32 | 1.19 |

Example 104 is considered conventional steam reforming of methane with carbon dioxide and has a steam to methane mole ratio of 1.5 to 1. Examples 105 and 106 demonstrates the utility of the present invention. Example 107 demonstrates the reduced production of carbon monoxide and synthesis gas as compared to Examples 104 through 106. These examples clearly show that the substitution of a portion of steam with hydrogen, reducing the quantity of methane by the quantity of hydrogen added to the feed gas, and adding carbon dioxide to the feed gas in the amount that the methane was reduced, results in a product gas with lower carbon monoxide than that produced by conventional steam reforming. When carbon monoxide is the desired product these results are undesirable even though methane feed requirements are lower. Comparing Examples 106 and 107, the quantity of carbon monoxide produced in Example 106 is 32.9% greater and the quantity of synthesis gas produced is 53.0% greater.

Examples 108 through 111

These examples demonstrate the utility of adding hydrogen to the feed gas of synthesis gas processes that are substantially different than steam reforming of methane and carbon dioxide. A 0.75 percent platinum on alumina catalyst was charged to the pilot plant unit and activated with hydrogen. The reaction temperature was set at 926° C. and a feed gas containing approximately a 1.6:1 to 1.9:1 mole ratio of carbon dioxide to methane was introduced to the reactor. Hydrogen was added to the feed gas as shown in Table 7.

TABLE 7

| Example | Feed Gas Mole Ratio | | | Product Composition Mole % (Dry Basis) | | | | H2/CO Ratio | Reaction Time, hr |
|---|---|---|---|---|---|---|---|---|---|
| | $CH_4$ | $CO_2$ | $H_2$ | CO | $H_2$ | $CH_4$ | $CO_2$ | | |
| 108 | 1 | 1.64 | 0 | 52.4 | 38.2 | 1.3 | 8.1 | 0.73 | 120 |
| 109 | 1 | 1.66 | 0.73 | 47.4 | 45.1 | 1.4 | 6.1 | 0.95 | 16 |
| 110 | 1 | 1.64 | 1.24 | 43.4 | 49.9 | 1.4 | 5.3 | 1.15 | 24 |
| 111 | 1 | 1.89 | 4.27 | 29.9 | 64.6 | 1.5 | 4.0 | 2.16 | 5 |

These results show that the addition of hydrogen increased the conversion of carbon dioxide to desired product and that the overall concentration of synthesis gas in the product stream increased. U.S. Pat. No. 5,068,057 discloses a process for the preparation of a mixture of hydrogen and carbon monoxide in a mole ratio of about 1:1.5 to 2:1 using a supported platinum catalyst. The cited patent discloses that in order to achieve a high (greater than 1:1) hydrogen to carbon monoxide ratio, an excessive amount of methane would be unconverted (see Table 2 of the cited patent). The addition of hydrogen to the reforming of methane and carbon dioxide by platinum catalyst is a significant improvement in both conversion of feed materials to product and to control of the final product distribution. As illustrated in Examples 108 through 111 the addition of hydrogen could be used to produce a hydrogen to carbon monoxide ratio as high as desired by increasing the relative concentration of hydrogen in the feed gas. These results demonstrate the utility of hydrogen for processes other then the reforming of methane with carbon dioxide and hydrogen using a supported nickel catalyst.

Example 112

This example illustrates the advantage of hydrogen addition to a coal gasification process which produces a mixture of carbon monoxide, hydrogen, carbon dioxide, water and a minor quantity of hydrogen sulfide. A slurry comprised of approximately 30 weight percent water and 70 weight percent coal is continuously fed to a gasifier. The oxygen to carbon mole ratio is approximately 0.9:1 to 1.1:1 to obtain complete consumption of coal and to maintain a desired temperature of approximately 1,400° C. and 4,200 kPa. A gas containing (water excluded) approximately 60.7 moles carbon monoxide, 49.9 moles hydrogen, 23.3 moles carbon dioxide, and 1.5 moles hydrogen sulfide is produced under these conditions. While maintaining the same feed composition and temperature as described above, the addition of 10 moles of hydrogen per 100 moles of gas contained in the gasifier is projected to result in a product gas containing (water excluded) 64.3 moles carbon monoxide, 66.3 moles hydrogen, 19.6 moles carbon dioxide, and 1.5 moles hydrogen sulfide. These results show that an increase in the number of moles of carbon monoxide produced could be realized in a coal gasification process by the suitable addition of hydrogen and that the total moles of synthesis gas, carbon monoxide plus hydrogen, produced can be increased. The total number of moles of carbon dioxide to be recovered from the product gas is reduced.

We claim:

1. A process for the preparation of a mixture of hydrogen and carbon monoxide comprising contacting a feed mixture of carbon dioxide, hydrogen, at least one hydrocarbon and, optionally, water with a catalyst containing an active metal at a temperature of about 650° to 1450° C., at a pressure of 1 kPa to 70,000 kPa wherein the mole ratio of water plus hydrogen to hydrocarbon and the mole ratio of hydrogen to hydrocarbon are both below 1.5:1 and wherein the resulting amount of carbon dioxide in the product stream is less than 20 mole percent.

2. The process according to claim 1 wherein the hydrocarbon is selected from the group consisting of light hydrocarbons, naphtha, mineral spirits, coal tars, hydrocracking bottoms, and coal.

3. The process according to claim 2 wherein said hydrocarbon is selected from the group consisting of methane, ethane, propane, butane, and mixtures of any two or more thereof.

4. The process according to claim 1 wherein said hydrocarbon is methane.

5. The process according to claim 1 wherein the ratio of feed gases varies within the following mole ratio ranges: hydrogen or $H_2O$+hydrogen to methane ratio is 0.1:1 to less than 1.5:1; carbon dioxide to methane ratio is 0.01:1 to 100:1; and carbon dioxide to hydrogen ratio is 0.01:1 to 200:1.

6. The process according to claim 1 wherein said catalyst is in the form of a supported catalyst in a fixed bed that has the active metal on a stable support.

7. The process according to claim 6 wherein said catalyst contains in the range of about 0.5 up to 25 weight percent active metal on said support.

8. The process according to claim 7 wherein said metal is platinum.

9. The process according to claim 7 wherein said metal is nickel.

10. The process according to claim 1 wherein said support is selected from the group consisting of alumina and magnesium oxide.

11. The process according to claim 1 wherein said contacting is carried out at a temperature in the range of about 700° C. up to 1,100° C.

12. The process according to claim 1 wherein said contacting is carried out at a pressure in the range of about 7 kPa up to 5,250 kPa.

13. The process according to claim 1 wherein the gas hourly space velocity of said contacting is within the range of about 7,000 to 30,000 meters per hour.

14. The process according to claim 1 wherein said contacting produces hydrogen and carbon monoxide at a mole ratio of hydrogen to carbon monoxide from 0.5:1 to 10:1.

15. The process according to claim 14 wherein said contacting produces hydrogen and carbon monoxide at a ratio of hydrogen to carbon monoxide from 0.7:1 to 3:1.

* * * * *